United States Patent
Fuller et al.

(10) Patent No.: US 6,906,125 B2
(45) Date of Patent: Jun. 14, 2005

(54) COMPOSITION COMPRISING TRISAMINO-TRIPHENYL COMPOUND

(75) Inventors: Timothy J. Fuller, Pittsford, NY (US); Kenny-Tuan T. Dinh, Webster, NY (US); John F. Yanus, Webster, NY (US); Yuhua Tong, Webster, NY (US); Markus R. Silvestri, Fairport, NY (US); Dale S. Renfer, Webster, NY (US)

(73) Assignee: Xerox Corporation, Stamford, CT (US)

( * ) Notice: Subject to any disclaimer, the term of this patent is extended or adjusted under 35 U.S.C. 154(b) by 241 days.

(21) Appl. No.: 10/262,418

(22) Filed: Sep. 30, 2002

(65) Prior Publication Data

US 2004/0063829 A1 Apr. 1, 2004

(51) Int. Cl.$^7$ .................... C08K 5/17; C08K 5/09; C08K 5/13
(52) U.S. Cl. .................. 524/244; 524/255; 524/291; 524/602
(58) Field of Search .................. 524/244, 255, 524/291, 602

(56) References Cited

U.S. PATENT DOCUMENTS

| 6,197,464 B1 | 3/2001 | Dinh et al. | 430/58.75 |
| 6,207,334 B1 | 3/2001 | Dinh et al. | 430/58.8 |

FOREIGN PATENT DOCUMENTS

| JP | 61-17556 | * | 6/1986 |

OTHER PUBLICATIONS

Ishikawa et al, JP 61–117556, Jun. 4, 1986, English translation.*

* cited by examiner

Primary Examiner—Kriellion A. Sanders
(74) Attorney, Agent, or Firm—Annette L. Bade (57) ABSTRACT

A composition having a trisamino triphenyl compound and a layer composition having a trisamino triphenyl compound and a polyamide.

11 Claims, 1 Drawing Sheet

COMPOSITION COMPRISING TRISAMINO-TRIPHENYL COMPOUND

CROSS REFERENCE TO RELATED APPLICATIONS

Attention is directed to U.S. patent application Ser. No. 10/262,417, filed Sep. 30, 2002, entitled, "Photosensitive Member Having Deletion Control Additive," the disclosure of this reference is hereby incorporated by reference in its entirety.

BACKGROUND OF THE INVENTION

The present invention is directed to compositions useful as deletion control additives in photosensitive members or photoconductors useful in electrostatographic apparatuses, including printers, copiers, other reproductive devices, and digital apparatuses. In embodiments, the deletion control additives comprise a trisamino triphenyl compound. The composition, in embodiments, provides longer life, low wear rate, little or no deletions, and can be coated thicker than known coatings.

Electrophotographic imaging members, including photoreceptors or photoconductors, typically include a photoconductive layer formed on an electrically conductive substrate or formed on layers between the substrate and photoconductive layer. The photoconductive layer is an insulator in the dark, so that electric charges are retained on its surface. Upon exposure to light, the charge is dissipated, and an image can be formed thereon, developed using a developer material, transferred to a copy substrate, and fused thereto to form a copy or print.

Many advanced imaging systems are based on the use of small diameter photoreceptor drums. The use of small diameter drums places a premium on photoreceptor life. A major factor limiting photoreceptor life in copiers and printers, is wear. The use of small diameter drum photoreceptors exacerbates the wear problem because, for example, 3 to 10 revolutions are required to image a single letter size page. Multiple revolutions of a small diameter drum photoreceptor to reproduce a single letter size page can require up to 1 million cycles from the photoreceptor drum to obtain 100,000 prints, a desirable goal for commercial systems.

For low volume copiers and printers, bias charging rolls (BCR) are desirable because little or no ozone is produced during image cycling. However, the microcorona generated by the BCR during charging, damages the photoreceptor, resulting in rapid wear of the imaging surface, for example, the exposed surface of the charge transport layer. More specifically, wear rates can be as high as about 16 microns per 100,000 imaging cycles. Similar problems are encountered with bias transfer roll (BTR) systems.

One approach to achieving longer photoreceptor drum life is to form a protective overcoat on the imaging surface, for example, the charge transporting layer of a photoreceptor. This overcoat layer must satisfy many requirements, including transporting holes, resisting image deletion, resisting wear, and avoidance of perturbation of underlying layers during coating.

Various overcoats employing alcohol soluble polyamides have been proposed in the prior art. One of the earliest ones is an overcoat comprising an alcohol soluble polyamide without any methyl methoxy groups (Elvamide®) containing N,N'-diphenyl-N,N'-bis(3-hydroxyphenyl)-(1,1'-biphenyl)-4,4'-diamine. This overcoat is described in U.S. Pat. No. 5,368,967, the entire disclosure thereof being incorporated herein by reference. Although this overcoat had very low wear rates in machines employing corotrons for charging, the wear rates were higher in machines employing BCR.

A crosslinked polyamide overcoat overcame this shortcoming. This overcoat comprised a crosslinked polyamide containing N,N'-diphenyl-N,N'-bis(3-hydroxyphenyl)-(1,1'-biphenyl)-4,4'-diamine, and referred to as Luckamide®. In order to achieve crosslinking, a polyamide polymer having N-methoxymethyl groups (Luckamide®) was employed along with a catalyst such as oxalic acid. This tough overcoat is described in U.S. Pat. No. 5,702,854, the entire disclosure thereof being incorporated herein by reference. With this overcoat, very low wear rates were obtained in machines employing bias charging rolls (BCR) and bias transfer rolls (BTR). Durable photoreceptor overcoatings containing crosslinked polyamide (i.e., Luckamide®) containing N,N'-diphenyl-N,N'-bis(3-hydroxyphenyl)-(1,1'-biphenyl)-4,4'-diamine (DHTPD) (Luckamide®-DHTPD) have been prepared using oxalic acid and trioxane to improve photoreceptor life by at least a factor of 3 to 4. Such improvement in the bias charging roll wear resistance involved crosslinking of Luckamide® under heat treatment, for example, 110° C.–120° C. for 30 minutes.

However, adhesion of this overcoat to certain photoreceptor charge transport layers, containing certain polycarbonates (e.g., Z-type 300) and charge transport materials such as bis-N,N-(3,4-dimethylphenyl)-N-(4-biphenyl) amine and N,N'-diphenyl-N,N'-bis(3-methylphenyl)-(1,1'-biphenyl)-4,4'-diamine, is greatly reduced under some drying conditions. On the other hand, under drying conditions of below about 110° C., the overcoat adhesion to the charge transport layer was good, but the overcoat had a high rate of wear. Thus, there was an unacceptably small drying condition window for the overcoat to achieve the targets of both adhesion and wear rate.

U.S. Pat. No. 5,702,854 to Schank et al. discloses an electrophotographic imaging member including a supporting substrate coated with at least a charge generating layer, a charge transport layer and an overcoating layer. The overcoating layer comprises a dihydroxy arylamine dissolved or molecularly dispersed in a crosslinked polyamide matrix. The overcoating layer is formed by crosslinking a crosslinkable coating composition including a polyamide containing N-methoxy methyl groups attached to amide nitrogen atoms, a crosslinking catalyst and a dihydroxy amine, and heating the coating to crosslink the polyamide.

U.S. Pat. No. 5,681,679 issued to Schank, et al. discloses a flexible electrophotographic-imaging member including a supporting substrate and a resilient combination of at least one photoconductive layer and an overcoating layer. The at least one photoconductive layer comprises a hole transporting arylamine siloxane polymer and the overcoating comprising a crosslinked polyamide doped with a dihydroxy amine.

U.S. Pat. No. 6,004,709, issued to Renfer et al. discloses an allyloxypolyamide composition. The allyloxypolyamide is represented by a specific formula. The allyloxypolyamide may be synthesized by reacting an alcohol soluble polyamide with formaldehyde and an allylalcohol.

U.S. Pat. No. 5,976,744 issued to Fuller et al. discloses an electrophotographic imaging member including a supporting substrate coated with at least one photoconductive layer, and an overcoating layer. The overcoating layer includes hydroxy functionalized aromatic diamine and a hydroxy functionalized triarylamine dissolved or molecularly dispersed in a crosslinked acrylated polyamide matrix. The hydroxy functionalized triarylamine is a compound different from the polyhydroxy functionalized aromatic diamine.

U.S. Pat. No. 5,709,974 issued to Yuh et al. discloses an electrophotographic-imaging member including a charge generating layer, a charge transport layer and an overcoating layer. The transport layer includes a charge transporting aromatic diamine molecule in a polystyrene matrix. The overcoating layer includes a hole transporting hydroxy arylamine compound having at least two hydroxy functional groups, and a polyamide film forming binder capable of forming hydrogen bonds with the hydroxy functional groups of the hydroxy arylamine compound.

U.S. Pat. No. 5,368,967 issued to Schank et al. discloses an electrophotographic imaging member comprising a substrate, a charge generating layer, a charge transport layer, and an overcoat layer comprising a small molecule hole transporting arylamine having at least two hydroxy functional groups, a hydroxy or multihydroxy triphenyl methane, and a polyamide film forming binder capable of forming hydrogen bonds with the hydroxy functional groups such as the hydroxy arylamine and hydroxy or multihydroxy triphenyl methane. This overcoat layer may be fabricated using an alcohol solvent. This electrophotographic imaging member may be used in an electrophotographic imaging process. Specific materials including ELVAMIDE® polyamide and N,N'-diphenyl-N,N'-bis(3-hydroxyphenyl)-(1,1'-biphenyl)-4,4'-diamine and bis-[2-methyl-4-(N-2-hydroxyethyl-N-ethyl-aminophenyl)]-phenylmethane are disclosed in this patent.

U.S. Pat. No. 4,871,634 to Limburg et al. discloses an electrostatographic-imaging member containing at least one electrophotoconductive layer. The imaging member comprises a photogenerating material and a hydroxy arylamine compound represented by a certain formula. The hydroxy arylamine compound can be used in an overcoat with the hydroxy arylamine compound bonded to a resin capable of hydrogen bonding such as a polyamide possessing alcohol solubility.

U.S. Pat. No. 4,297,425 to Pai et al. discloses a layered photosensitive member comprising a generator layer and a transport layer containing a combination of diamine and triphenyl methane molecules dispersed in a polymeric binder.

U.S. Pat. No. 4,050,935 to Limburg et al. discloses a layered photosensitive member comprising a generator layer of trigonal selenium and a transport layer of bis(4-diethylamino-2-methylphenyl) phenylmethane molecularly dispersed in a polymeric binder.

U.S. Pat. No. 4,457,994 to Pai et al. discloses a layered photosensitive member comprising a generator layer and a transport layer containing a diamine type molecule dispersed in a polymeric binder, and an overcoat containing triphenyl methane molecules dispersed in a polymeric binder.

U.S. Pat. No. 4,281,054 to Horgan et al., discloses an imaging member comprising a substrate, an injecting contact or hole injecting electrode overlying the substrate, a charge transport layer comprising an electrically inactive resin containing a dispersed electrically active material, a layer of charge generator material, and a layer of insulating organic resin overlying the charge generating material. The charge transport layer can contain triphenylmethane.

U.S. Pat. No. 4,599,286 to Limburg et al. discloses an electrophotographic imaging member comprising a charge generation layer and a charge transport layer. The transport layer comprises an aromatic amine charge transport molecule in a continuous polymeric binder phase and a chemical stabilizer selected from the group consisting of certain nitrone, isobenzofuran, hydroxyaromatic compounds and mixtures thereof. An electrophotographic imaging process using this member is also described.

U.S. Pat. No. 5,418,107 to Nealey et al. discloses a process for fabricating an electrophotographic-imaging member.

One of the most noticeable problems in current organic photoreceptors is lateral charge migration (LCM), which results in the deletion of electrophotographic images. The primary cause of LCM is the increased conductivity of the photoreceptor surface, which results in charge movement of the latent electrostatic image. The development of charge pattern results in toned images that are less precise than the originals. The increase in surface conductivity is believed to be primarily due to oxidation of the charge transport molecule by nitrous oxides effluents from bias charging roll and corona charging devices. The problem is particularly evident in some machines, wherein there are several charging corotrons, and in photoreceptors where there is little surface wear on the photoreceptor and the conductive oxidized species are not worn away. The latter is the case with crosslinked polyamide overcoats.

To eliminate LCM, tetrakis methylene(3,5-di-tert-butyl-4-hydroxy hydrocinnamate) methane (Irganox 1010), butylated hydroxytoluene (BHT), bis(4-diethylamino-2-methylphenyl) phenylmethane (BDETPM), bis-[2-methyl-4-(N-2-hydroxyethyl-N-ethyl-aminophenyl)]-phenylmethane (DHTPM), and the like, have been added to the charge transport layer of organic photoreceptors with arylamine charge transporting species. To eliminate gross macroscopic deletions of Kanji characters in the A zone, BDETPM or DHTPM has been added to the polyamide overcoat formulations. However, in the case of the polyamide overcoat, all these deletion control additives have been shown to be inadequate.

It appears that deletion is most apparent in the polyamide overcoat because of its extreme resistance to wear (10 nm/kilocycle with bias charging rolls and 4 nm/kilocycle with scorotron charging). Because the oxidized surface does not wear off appreciably, deletion from the polyamide overcoat is more apparent than in polycarbonate charge transport layers where the greater wear rates continually refresh the photoconductor surface. Therefore, new and improved deletion control additives are needed to preserve image quality in polyamide overcoated photoreceptor drums and belts, by reducing or eliminating lateral charge migration and the resultant print defects caused by corona effluents on photoreceptor surfaces. It is further desired to provide an overcoat for photoreceptors that accelerates hole transport through the overcoat layer to eliminate or reduce lateral charge migration. In addition, it is also desired to provide a photoreceptor coating that allows the preservation of half-toned and high frequency print features of 300 dots per inch and less to be maintained for more than 2,000 continuous prints (or at least 8,000 photoreceptor cycles) in the A, B and C zones.

SUMMARY OF THE INVENTION

Embodiments of the present invention include: a composition comprising a trisamino triphenyl compound having the following formula I:

wherein $R^1$, $R^2$, and $R^3$ are the same or different and are an alkyl group having from about 1 to about 15 carbons.

Embodiments further include: a layer composition comprising a polyamide and a trisamino triphenyl compound having the following formula I:

wherein $R^1$, $R^2$, and $R^3$ are the same or different and are an alkyl group having from about 1 to about 15 carbons.

In addition, embodiments include: a composition comprising a trisamino triphenyl compound having the following formula II:

BRIEF DESCRIPTION OF THE DRAWINGS

For a better understanding of the present invention, reference may be had to the accompanying figure.

DETAILED DESCRIPTION OF THE PRESENT INVENTION

The present invention relates to compositions, which can be used as deletion control additives to preserve image quality in overcoated photoreceptor drums and belts. In embodiments, the composition comprises a trisamino triphenyl compound.

Figure 1:
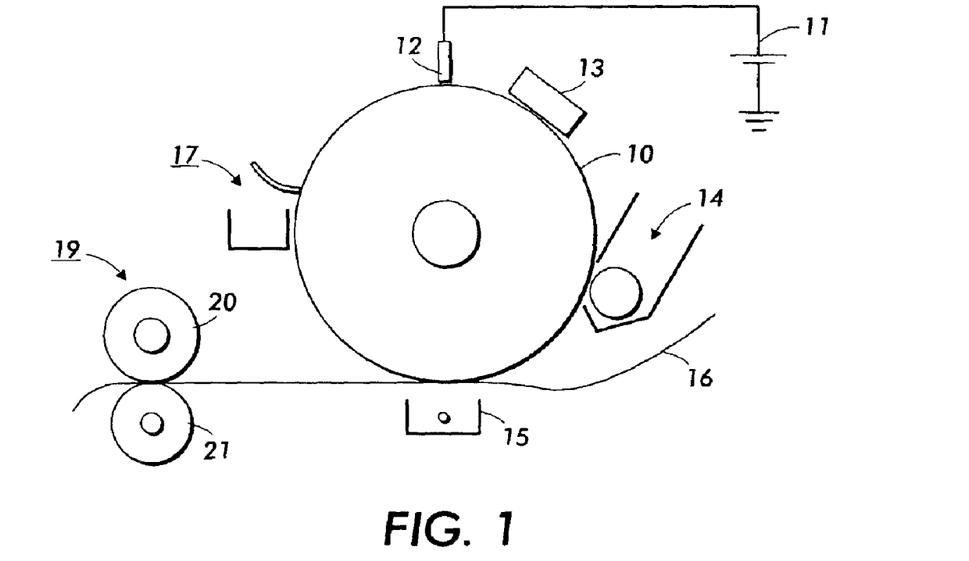
FIG. 1 is an illustration of a general electrostatographic apparatus using a photoreceptor member.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
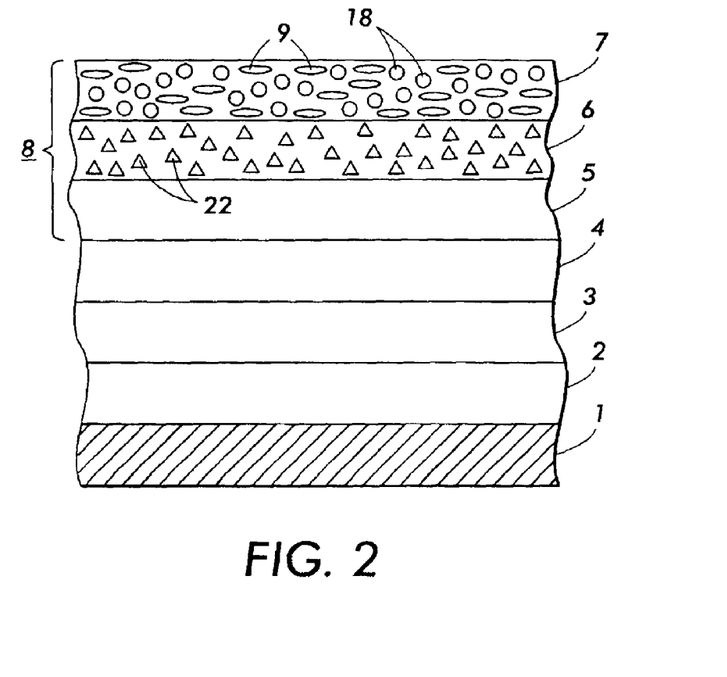
FIG. 2 is an illustration of an embodiment of a photoreceptor showing various layers.

Electrophotographic imaging members are well known in the art. Electrophotographic imaging members may be prepared by any suitable technique. Referring to FIG. 2, typically, a flexible or rigid substrate 1 is provided with an electrically conductive surface or coating 2.

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like. The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

In embodiments where the substrate layer is not conductive, the surface thereof may be rendered electrically conductive by an electrically conductive coating 2. The conductive coating may vary in thickness over substantially wide ranges depending upon the optical transparency, degree of flexibility desired, and economic factors. Accordingly, for a flexible photoresponsive imaging device, the thickness of the conductive coating may be between about 20 angstroms to about 750 angstroms, or from about 100 angstroms to about 200 angstroms for an optimum combination of electrical conductivity, flexibility and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium and hafnium, titanium, nickel, stainless steel, chromium, tungsten, molybdenum, and the like.

An optional hole blocking layer 3 may be applied to the substrate 1 or coating. Any suitable and conventional blocking layer capable of forming an electronic barrier to holes between the adjacent photoconductive layer 8 (or electrophotographic imaging layer 8) and the underlying conductive surface 2 of substrate 1 may be used.

An optional adhesive layer 4 may be applied to the hole-blocking layer 3. Any suitable adhesive layer well known in the art may be used. Typical adhesive layer materials include, for example, polyesters, polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the hole blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

At least one electrophotographic imaging layer 8 is formed on the adhesive layer 4, blocking layer 3 or substrate 1. The electrophotographic imaging layer 8 may be a single layer (7 in FIG. 2) that performs both charge-generating and charge transport functions as is well known in the art, or it may comprise multiple layers such as a charge generator layer 5 and charge transport layer 6.

The charge generating layer 5 can be applied to the electrically conductive surface, or on other surfaces in between the substrate 1 and charge generating layer 5. A charge blocking layer or hole-blocking layer 3 may optionally be applied to the electrically conductive surface prior to the application of a charge generating layer 5. If desired, an adhesive layer 4 may be used between the charge blocking or hole-blocking layer 3 and the charge generating layer 5. Usually, the charge generation layer 5 is applied onto the blocking layer 3 and a charge transport layer 6, is formed on the charge generation layer 5. This structure may have the charge generation layer 5 on top of or below the charge transport layer 6.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, or from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. Typical application techniques include spraying, dip coating, roll coating, wire wound rod coating, vacuum sublimation and the like. For some applications, the generator layer may be fabricated in a dot or line pattern. Removing of the solvent of a solvent coated layer may be effected by any suitable conventional technique such as oven drying, infrared radiation drying, air drying and the like.

The charge transport layer 6 may comprise a charge transporting small molecule 22 dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4"-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis (4-N,N'-diethylaminophenyl)-1,2,4-oxadiazole, stilbenes and the like. However, to avoid cycle-up in machines with high throughput, the charge transport layer should be substantially free (less than about two percent) of di or triaminotriphenyl methane. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-diamine. If desired, the charge transport material in the charge transport layer may comprise a polymeric charge transport material or a combination of a small molecule charge transport material and a polymeric charge transport material.

Any suitable electrically inactive resin binder insoluble in the alcohol solvent used to apply the overcoat layer may be employed in the charge transport layer of this invention. Typical inactive resin binders include polycarbonate resin, polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene)carbonate (also referred to as bisphenol-A-polycarbonate, poly(4,4'-cyclohexylidinediphenylene) carbonate (referred to as bisphenol-Z polycarbonate), poly(4, 4'-isopropylidene-3,3'-dimethyl-diphenyl)carbonate (also referred to as bisphenol-C-polycarbonate) and the like. Any suitable charge-transporting polymer may also be used in the charge-transporting layer of this invention. The charge transporting polymer should be insoluble in the alcohol solvent employed to apply the overcoat layer of this invention. These electrically active charge transporting polymeric materials should be capable of supporting the injection of photogenerated holes from the charge generation material and be incapable of allowing the transport of these holes therethrough.

Any suitable and conventional technique may be used to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 10 and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1. The charge transport layer, is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

In embodiments, an overcoat is coated on the charge-generating layer. In embodiments, a polyamide resin is used as the resin in the overcoat layer. In embodiments, the polyamide is an alcohol-soluble polyamide. In embodiments, the polyamide comprises pendant groups selected from the group consisting of methoxy, ethoxy and hydroxy pendant groups. In embodiments, the pendant groups are methylene methoxy pendant groups. In embodiments, the polyamide has the following formula III:

wherein $R_1$, $R_2$ and $R_3$ are alkyl groups having from about 1 to about 15 carbons, or from about 1 to about 10 carbons, or from about 1 to about 5 carbons, such as methyl, ethyl, propyl, butyl, and the like, and n is a number of from about 50 to about 1,000, or from about 150 to about 500, or about 270. Typical commercially available alcohol-soluble polyamide polymers suitable for use herein include those sold under the tradenames LUCKAMIDE® 5003 from Dai Nippon Ink, NYLON® 8, CM4000® and CM8000® both from Toray Industries, Ltd., and other polyamides such as those prepared according to the method described in Sorenson and Campbell, "Preparative Methods of Polymer Chemistry," second edition, pg. 76, John Wiley & Sons, Inc., 1968, and the like, and mixtures thereof. In embodiments, the polyamide has methoxy, ethoxy and hydroxy groups, including N-methoxymethyl, N-ethoxymethyl, and N-hydroxymethyl pendant groups.

The polyamide is present in the overcoat in an amount of from about 20 to about 90 percent, or from about 40 to about 60 percent by weight of total solids.

A deletion control agent (9 and/or 18 in FIG. 2) is present in the overcoat layer. The deletions can occur due to the oxidation effects of the corotron or bias charging roll (BCR) effluents that increases the conductivity of the photoreceptor surface. The present deletion control agents minimize this conductivity change. A class of known deletion control agents that have been effective with some polymers include triphenyl methanes with nitrogen containing substituents such as bis-(2-methyl-4-diethylaminophenyl)-phenylmethane and the like. Other deletion control agents include, for example, hindered phenols such as butylated hydroxy toluene and the like.

However, the above deletion control agents do not allow for effective deletion control when used with polyamide layers. The problem is escalated when the photoreceptor is used in a high-speed machine that uses charging corotrons, and when polyamide is used as the layer where there is little surface wear on the photoreceptor and the conductive oxidized species are not worn away. IRGANOX 1010, BHT, BDETPM, DHTPM, and the like, have been added to the charge transport layer with arylamide charge transporting species. However, in the case of the polyamide overcoat, these known deletion control additives have proven inadequate. Deletion is most apparent in the polyamide overcoat because of its extreme resistance to wear (10 nm/kilocycle with BCR and 4 nm/kilocycle with scorotron charging). Because the oxidized surface does not wear off appreciably, deletion from polyamide overcoats is more apparent than in polycarbonate charge transport layers, where the greater wear rates continually refresh the photoconductor surface.

A new deletion control agent can be added to the outer layer. In embodiments, the deletion control agent is a trisamino triphenyl compound. Examples of trisamino triphenyl compound include those having the following formula I:

wherein $R^1$ and $R^2$ and $R^3$ can be the same or different and can be an alkyl group of from about 1 to about 15 carbons, or from about 1 to about 10 carbons, or from about 1 to about 5 carbons, such as methyl, ethyl, propyl, butyl, pentyl, and the like.

In another embodiment, trisamino triphenyl compound is di(4-N,N-diethylamino-2-methylphenyl)-N,N-diethylaminophenyl (TEA-TPM) and has the following formula II:

The deletion control trisamino triphenyl compound can be present in a polyamide layer composition in an amount of from about 5 to about 40 percent, or from about 10 to about 30 percent, or from about 15 to about 20 percent by weight of total solids.

A second deletion control agent 22 or a charge control agent 22, can be present in the outer overcoat layer in addition to the trisamino triphenyl compound. Examples include those deletion control agents listed above, such as DHTBD, DHTPM, TPM, BDETMP, bis (4-diethylamino-2-methylphenyl) triphenyl methane, tetrakis methylene (3,5-di-tert-butyl-4-hydroxy hydrocinnamate) methane, bis-[2-methyl-4-(N-2-hydroxyethyl-N-ethyl-aminophenyl)]-phenylmethane, and the like. The charge transport molecules or second deletion control agents are present in the overcoat layer in an amount of from about 50 to about 99 percent, or from about 60 to about 90 percent or from about 70 to about 80 percent by weight of total solids.

Crosslinking agents can be used in combination with the overcoat to promote crosslinking of the polymer, such as the polyamide, thereby providing a strong bond. Examples of suitable crosslinking agents include oxalic acid, p-toluene sulfonic acid, phosphoric acid, sulfuric acid, and the like, and mixtures thereof. In embodiments, the crosslinking agent is oxalic acid. The crosslinking agent can be used in an amount of from about 1 to about 20 percent, or from about 5 to about 10 percent, or about 8 to about 9 percent by weight of total polymer content.

The thickness of the continuous overcoat layer selected depends upon the abrasiveness of the charging (e.g., bias charging roll), cleaning (e.g., blade or web), development (e.g., brush), transfer (e.g., bias transfer roll), etc., in the system employed and can range up to about 10 micrometers. In embodiments, the thickness is from about 1 micrometer and about 5 micrometers. Any suitable and conventional technique may be used to mix and thereafter apply the overcoat layer coating mixture to the charge-generating layer. Typical application techniques include spraying, dip coating, roll coating, wire wound rod coating, and the like. Drying of the deposited coating may be effected by any suitable conventional technique such as oven drying, infrared radiation drying, air drying, and the like. The dried overcoating of this invention should transport holes during imaging and should not have too high a free carrier concentration. Free carrier concentration in the overcoat increases the dark decay. In embodiments, the dark decay of the overcoated layer should be about the same as that of the unovercoated device.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Comparative Example I
Photoreceptor Outer Coatings Using Known Deletion Control Additives Electrophotographic imaging members were prepared by applying by dip coating, a charge blocking layer on a rough surface of seventeen aluminum drums having a diameter of 3 cm and a length of 31 cm. The blocking layer coating mixture was a solution of 8 weight percent polyamide (nylon 6) dissolved in a 92 weight percent butanol, methanol and water solvent mixture. The butanol, methanol and water mixture percentages were 55, 36 and 9 percent by weight, respectively. The coating was applied at a coating bath withdrawal rate of about 30 cm/minute. After drying in a forced air oven, each blocking layers had a thickness of 1.5 micrometers. The dried blocking layers were coated with a charge generating layer containing 2.5 weight percent hydroxyl gallium phthalocyanime pigment particles, 2.5 weight percent polyvinylbutyral film forming polymer and 95 weight percent cyclohexanone solvent. The coatings were applied at a coating bath withdrawal rate of about 30 cm/minute. After drying in a forced air oven, each charge-generating layer had a thickness of 0.2 micrometer. The drums were subsequently coated with charge transport layers containing N,N'-diphenyl-N,N'-bis(3-methylphenyl)-1,1;-biphenyl-4,4'-diamine dispersed in polycarbonate binder (PcZ400). The charge transport coating mixture consisted of 8 weight percent N,N'-diphenyl-N,N'-bis(3-methylphenyl)-1,1;-biphenyl-4,4'-diamine, 12 weight percent binder and 80 weight percent monochlorobenzene solvent. The dried thickness of each transport layer was 20 micrometers.

Comparative Example 2

One drum from Example 1 was overcoated with a protective layer coating solution. Its composition was prepared as followed: 0.7 grams polyamide containing methoxymethyl groups (Luckamide® 5003 available from Dai Nippon Ink), 0.3 grams ELVAMIDE® 8063 (available from E.I. Dupont), methanol (3.5 grams) and 1-propanol (3.5 grams) were all combined in a 2 ounce amber bottle and warmed with magnetic stirring in a water bath at about 60° C. A solution formed within 30 minutes. This solution was then allowed to cool to 25° C. Next, 0.08 grams oxalic acid was added and the mixture was warmed to 40° C. Subsequently, 0.9 grams N,N'-diphenyl-N,N'-bis(3-hydroxyphenyl)-[1,1'-biphenyl]-4,4'-diamine (DHTPD) was added and stirred until a complete solution was formed. A separate solution containing 0.08 grams Cymel®303 (hexamethoxymethylmelamine available from the Cytec Industries Inc.) and 0.2 grams bis(4-diethylamino-2-methylphenyl)-4-methoxyphenylmethane and one gram tetrahydrofuran was formed and added to the polymer solution. The solution was allowed to set overnight to insure mature viscosity properties A 6-micrometer thick overcoat was applied in the dip coating apparatus with a pull rate of 250 millimeters/min. The overcoated drum was dried at 120° C. for 35 minutes.

The photoreceptor was print tested in a Xerox Docucolor 12/50 copy machine for 4000 consecutive prints. There were significant reductions in image sharpness and color intensity, resulting from the print deletions caused by the overcoat. An unovercoated drum of Example A and the overcoated drum of Example B above were tested in a wear fixture that contained a bias charging roll for charging. Wear was calculated in terms of nanometers/kilocycles of rotation (nm/Kc). Reproducibility of calibration standards was about +−0.2 nm/Kc. The wear of the drum without the overcoat of Example A was greater than 80 nm/Kc. Wear of the overcoated drums of Example B was about 20 nm/Kc.

Comparative Example 3

One drum from Comparative Example 1 was overcoated with a protective layer coating solution as prepared in Comparative Example 2, except that the following substitutions were made.

An amount of 0.8 grams N,N'-diphenyl-N,N'-bis(3-hydroxyphenyl)-(1,1'-biphenyl)-4,4'-diamine (DHTPD) was used instead of 0.9 grams. An amount of 0.2 grams tetrakis [methylene (3,5-di-tert-butyl-4-hydroxy hydrocinnamate)] methane (Irganox 1010) was substituted for 0.2 grams bis (4-diethylamino-2-methylphenyl)-4-methoxyphenylmethane. The drum was tested in accordance with Comparative Example 2. Its wear rate was about 33 nm/Kc.

Comparative Example 4

One drum from Comparative Example 1 was overcoated with a protective layer coating solution as prepared in Comparative Example 2, except that the following substitutions were made.

An amount of 0.2 grams butylated hydroxytoluene (BHT) was substituted for 0.2 grams bis (4-diethylamino-2-methylphenyl)-4-methoxyphenylmethane. The drum was tested in accordance with Comparative Example 2. Its wear rate was about 20 nm/Kc.

Comparative Example 5

One drum from Comparative Example 1 was overcoated with a protective layer coating solution as prepared in Comparative Example 2, except that the following substitutions were made.

An amount of 0.2 grams Perylene Bisimide pigmented particles was substituted for 0.2 grams bis (4-diethylamino-2-methylphenyl)-4-methoxyphenylmethane. The drum was tested in accordance with Comparative Example 2. Its wear rate was about 10 nm/Kc.

Comparative Example 6

Compositions of these comparative overcoated solutions using known deletion control additives are described in TABLE 1. Their corresponding wear rates are listed in TABLE 2. All values in table 1 are expressed in grams.

TABLE 1

| Comparative Example | Elvamide | Luckamide | Acid | DHTPD | Additive | Cymel 303 | Methanol/n-Propanol |
|---|---|---|---|---|---|---|---|
| 2 | 0.3 | 0.7 | 0.08 | 0.9 | MeOTPM 0.2 | 0.08 | 7 |
| 3 | 0.3 | 0.7 | 0.08 | 0.8 | Irganox 1010 0.2 | 0.08 | 7 |
| 4 | 0.3 | 0.7 | 0.1 | 0.9 | BHT 0.2 | 0.08 | 7 |
| 5 | 0.3 | 0.7 | 0.09 | 0.9 | Pigments 0.2 | 0.08 | 7 |

TABLE 2

| Comparative Example | Print Deletion? | BCR Wear nm/kc |
|---|---|---|
| 2 | Yes | 20 |
| 3 | Yes | 33 |
| 4 | Yes | 20 |
| 5 | Yes | 10 |

From the results above, it is clear that deletion occurred by use of a mixture of polyamides in combination with known charge transport materials such as DHTBD. Further, no known deletion control additive can prevent such a print deletion for polyamide overcoat.

The following examples describe overcoated compositions of embodiments of the present invention. They were made up with different concentrations of TEA-TPM and/or different binder ratios.

Example 7

Photoreceptor Outer Coatings Using TEA-TPM as a Deletion Control Additive

An amount of about 0.8 grams Luckamide® 5003 (available from Dai Nippon Ink) and 0.2 grams ELVAMIDE® 8063 (available from E.I. Dupont), methanol (3.5 grams) and 1-propanol (3.5 grams) were combined in an 2 ounce amber bottle and warmed with magnetic stirring in a water bath at about 60° C. A solution formed within 30 minutes which was then allowed to cool to 25° C. An amount of 0.08 grams oxalic acid was added and the mixture was warmed to 40° C. Subsequently, 0.9 grams N,N'-diphenyl-N,N'-bis (3-hydroxyphenyl)-[1,1'-biphenyl]-4,4'-diamine (DHTPD) was added and stirred until a complete solution was formed. A separate solution containing 0.08 grams Cymel® 303 (hexamethoxymethylmelamine available from the Cytec Industries Inc.) and 0.2 grams bis (4-N,N-diethylamino-2-methylphenyl)-4-N,N-diethylaminophenyl methane (TEA-TPM) and one grams tetrahydrofuran was formed then added to the polymer solution. The solution was allowed to set overnight to insure mature viscosity properties.

Example 8

The procedure set forth in Example 6 was repeated, except the following substitutions were made.

An amount of 0.85 grams Luckamide® 5003 and 0.15 grams ELVAMIDE® were substituted for 0.8 grams and 0.2 grams, respectively. An amount of 0.8 grams DHTPD was substituted for 0.9 grams DHTPD.

Example 9

The procedure set forth in Example 6 was repeated, except the following substitutions were made.

An amount of 1.0 grams Luckamide® 5003 and 0.3 grams ELVAMIDE® were substituted for 0.8 grams and 0.2 grams, respectively. An amount of 0.8 grams DHTPD was substituted for 0.9 grams DHTPD.

Example 10

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.1 grams oxalic acid was substituted for the 0.08 grams.

Example 11

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.9 grams oxalic acid was substituted for the 0.08 grams.

Example 12

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.8 grams DHTPD was substituted for the 0.9 grams DHTBD.

Example 13

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.1 grams TEA-TPD was substituted for the 0.2 grams TEA-TPD.

Example 14

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 1 gram oxalic acid was substituted for the 0.08 grams oxalic acid.

Example 15

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively.

Example 16

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.15 grams of TEA-TPM was substituted for 0.2 grams TEA-TPM.

Example 17

The procedure set forth in Example 6 was repeated, except the following substitutions were made.

An amount of 0.7 grams Luckamide® 5003 and 0.3 grams ELVAMIDE® were substituted for 0.3 grams and 0.2 grams, respectively. An amount of 0.1 grams of TEA-TPM was substituted for 0.2 grams TEA-TPM. An amount of 0.1 gram bis(4-diethylamino-2-methylphenyl) phenylmethane BDE-TPM was also added to the TEA-TPM.

Example 18

The formulations prepared from Examples 7 through 17 (listed in TABLE 3) were overcoated on 12 photoreceptor drums prepared from Comparative Example 1. They all were applied in the dip coating apparatus with a pull rate of 250 millimeters/min to obtain a 6 micrometer dried thickness for each drum. These overcoated drum were dried at 120° C. for 35 minutes. They were print tested in a Xerox Docucolor 12/50 copy machine for 4,000 consecutive prints. The print tests were carried out in 3 different environmental zones, e.g. A zone hot and humid), B zone (ambient condition) and C zone (cold and dry). There were no significant reductions in image sharpness and color intensity, and no other problems with background or print defect resulting from the overcoats. The 300 dpi and 600 dpi print resolutions were preserved during the 4,000 consecutive prints. These drums were then tested in a wear fixture that contained a bias charging roll for charging. Their wear rates are listed in TABLE 4.

TABLE 3

| Example | Luckamide | Elvamide | Oxalic acid | DHTPD | Tris-TPM | Cymel 303 | Methanol/n-Propanol |
|---|---|---|---|---|---|---|---|
| 7  | 0.8  | 0.2  | 0.08 | 0.9 | 0.2  | 0.08 | 7 |
| 8  | 0.85 | 0.15 | 0.08 | 0.8 | 0.2  | 0.08 | 7 |
| 9  | 1    | 0    | 0.08 | 0.8 | 0.2  | 0.08 | 7 |
| 10 | 0.7  | 0.3  | 0.1  | 0.9 | 0.2  | 0.08 | 7 |
| 11 | 0.7  | 0.3  | 0.09 | 0.9 | 0.2  | 0.08 | 7 |
| 12 | 0.7  | 0.3  | 0.08 | 0.8 | 0.2  | 0.08 | 7 |
| 13 | 0.7  | 0.3  | 0.1  | 0.9 | 0.1  | 0.08 | 7 |
| 14 | 0.7  | 0.3  | 0.1  | 0.9 | 0.2  | 0.08 | 7 |
| 15 | 0.7  | 0.3  | 0.08 | 0.9 | 0.2  | 0.08 | 7 |
| 16 | 0.7  | 0.3  | 0.08 | 0.9 | 0.15 | 0.08 | 7 |
| 17 | 0.7  | 0.3  | 0.08 | 0.9 | 0.1  | 0.08 | 7 |

TABLE 4

| Example | Print Deletion? | BCR Wear nm/kc |
|---|---|---|
| 7  | No  | 18 |
| 8  | No  | 18 |
| 9  | Yes | 10 |
| 10 | No  | 22 |
| 11 | No  | 38 |
| 12 | No  | 26 |
| 13 | Yes | 25 |
| 14 | No  | 12 |
| 15 | No  | 26 |
| 16 | Yes | 15 |
| 17 | Yes | 20 |

The above results demonstrate that print deletion is reduced or eliminated by use of TEA-TPM compound as a deletion control additive. Image quality in overcoated photoreceptor drums and belts can be improved by reducing or eliminating lateral charge migration and the resultant print defects caused by corona effluents on photoreceptor surfaces. The overcoat using TEA-TPM compound, in embodiments, accelerates hole transport through the overcoat layer to eliminate or reduce lateral charge migration. The photoreceptor coating using TEA-TPM compound, in embodiments, allows the preservation of half-toner and high frequency print features of 300 dots per inch and less to be maintained for more than 2,000 continuous prints (or at least 8,000 photoreceptor cycles) in the A, B and C zones.

While the invention has been described in detail with reference to specific and embodiments, it will be appreciated that various modifications and variations will be apparent to the artisan. All such modifications and embodiments as may readily occur to one skilled in the art are intended to be within the scope of the appended claims.

We claim:

1. A layer composition comprising a alcohol-soluble polyamide and a trisamino triphenyl compound having the following formula I:

wherein $R^1$, $R^2$, and $R^3$ are the same or different and are an alkyl group having from about 1 to about 15 carbons.

2. A layer composition in accordance with claim 1, wherein said trisamino triphenyl compound is present in the layer composition in an amount of from about 5 to about 40 percent by weight of total solids.

3. A layer composition in accordance with claim 1, wherein said alcohol-soluble polyamide comprises pendant groups selected from the group consisting of methoxy, ethoxy and hydroxy pendant groups.

4. A layer composition in accordance with claim 3, wherein said pendant groups are selected from the group consisting of N-methoxymethyl, N-ethoxymethyl, and N-hydroxymethyl pendant groups.

5. A layer composition in accordance with claim 4, wherein said polyamide has the following general formula III:

wherein $R_1$, $R_2$ and $R_3$ are the same or different arid are alkyl groups having from about 1 to about 15 carbons, and wherein n is a number of from about 50 to about 1.000.

6. A layer composition in accordance with claim 5, wherein said polyamide is crosslinked.

7. A layer composition in accordance with claim 1, wherein said composition further comprises a crosslinking agent.

8. A layer composition in accordance with claim 7, wherein said crosslinking agent is selected from the group consisting of oxalic acid, p-toluene sulfonic acid, phosphoric acid, sulfuric acid, and mixtures thereof.

9. A layer composition in accordance with claim 1, wherein said composition further comprises a second deletion control agent other than said trisamino triphenyl compound, wherein the first deletion control agent is said trisamino triphenyl compound.

10. A layer composition in accordance with claim 9, wherein said second deletion control agent is selected from the group consisting of tetrakis methylene (3,5-di-tert-butyl-4-hydroxy hydrocinnamate) methane, bis-[2-methyl-4-(N-2-hydroxyethyl-N-ethyl-aminophenyl)]-phenylmethane, bis(4-diethylamino-2-methylphenyl) triphenyl methane, and the mixtures thereof.

11. A layer composition comprising an alcohol-soluble polyamide and a trisamino triphenyl compound having the following Formula II